United States Patent
Tetsui et al.

(10) Patent No.: US 12,157,814 B2
(45) Date of Patent: Dec. 3, 2024

(54) RESIN COMPOSITION AND SYNTHETIC LEATHER

(71) Applicant: DIC Corporation, Tokyo (JP)

(72) Inventors: Tomohiro Tetsui, Takaishi (JP); Atsushi Ninomiya, Takaishi (JP)

(73) Assignee: DIC Corporation, Tokyo (JP)

( * ) Notice: Subject to any disclaimer, the term of this patent is extended or adjusted under 35 U.S.C. 154(b) by 1099 days.

(21) Appl. No.: 17/044,464

(22) PCT Filed: Mar. 28, 2019

(86) PCT No.: PCT/JP2019/013574
§ 371 (c)(1),
(2) Date: Oct. 1, 2020

(87) PCT Pub. No.: WO2019/202938
PCT Pub. Date: Oct. 24, 2019

(65) Prior Publication Data
US 2021/0040315 A1    Feb. 11, 2021

(30) Foreign Application Priority Data
Apr. 20, 2018 (JP) ................. 2018-081401

(51) Int. Cl.
C08L 75/04     (2006.01)
C08L 33/06     (2006.01)
D06N 3/04      (2006.01)
D06N 3/14      (2006.01)
D06N 3/18      (2006.01)

(52) U.S. Cl.
CPC ............. *C08L 75/04* (2013.01); *C08L 33/066* (2013.01); *D06N 3/042* (2013.01); *D06N 3/14* (2013.01); *D06N 3/183* (2013.01)

(58) Field of Classification Search
CPC ......... D06N 3/042; D06N 3/143–3/148; C08L 33/00–33/26; C08L 75/00–75/16
See application file for complete search history.

(56) References Cited

U.S. PATENT DOCUMENTS

| | | |
|---|---|---|
| 2010/0068499 A1 | 3/2010 | Kanagawa et al. |
| 2017/0044391 A1 | 2/2017 | Satgurunathan et al. |
| 2018/0142409 A1 | 5/2018 | Maeda |

FOREIGN PATENT DOCUMENTS

| | | |
|---|---|---|
| JP | H10-298491 A | 11/1998 |
| JP | 3068081 B1 | 7/2000 |
| JP | 2000-265053 A | 9/2000 |
| JP | 2002-146268 A | 5/2002 |
| JP | 2004-244435 A | 9/2004 |
| JP | 2005-89613 A | 4/2005 |
| JP | 2017-66358 A | 4/2017 |
| TW | 200835824 A | 9/2008 |

OTHER PUBLICATIONS

Machine translation of JP2004244435. Retrieved Apr. 6, 2024.*
Office Action dated Apr. 27, 2022, issued for the Taiwanese Patent Application No. 108112618 and English translation thereof.
International Search Report mailed Jun. 25, 2019, issued for PCT/JP2019/013574.

\* cited by examiner

*Primary Examiner* — Prashant J Khatri
(74) *Attorney, Agent, or Firm* — Locke Lord LLP; James E. Armstrong, IV; Nicholas J. DiCeglie, Jr.

(57) ABSTRACT

The present invention provides a resin composition containing a urethane resin (A), an acrylic resin (B), and water (C), in which the acrylic resin (B) is a polymer of a polymerizable compound containing a (meth)acrylic compound (b-1) having a hydroxy group and has a glass transition temperature of 40° C. or higher. The present invention also provides a synthetic leather having at least a base (i), an adhesive layer (ii), and a skin layer (iii), in which the skin layer (iii) is formed from the resin composition. The polymerizable compound as the raw material of the acrylic resin (B) preferably contains, in addition to (b-1), a polymerizable compound (b-2) in which a hydrogen bond term (δH) in Hansen solubility parameters is 2.2 $MPa^{0.5}$ or more.

8 Claims, No Drawings

RESIN COMPOSITION AND SYNTHETIC LEATHER

TECHNICAL FIELD

The present invention relates to a resin composition containing a urethane resin and an acrylic resin dispersed in water and a synthetic leather obtained using the resin composition.

BACKGROUND ART

Urethane resin compositions containing urethane resins dispersed in water can reduce the load on the environment as compared with conventional organic solvent-based urethane resin compositions and thus have recently begun to be suitably used as materials for the production of, for example, synthetic leathers, gloves, coating agents for curtains, sheets, and so forth.

Such a urethane resin composition is required to have good hardness for use in various applications. As a method for improving the hardness of a urethane resin, for example, a method in which a polyol having high crystallinity is used has been disclosed (see, for example, Patent Literature 1). However, in this method, film formability is poor, and the resulting film has problems of poor flexibility and texture (feel).

CITATION LIST

Patent Literature

PTL 1: Japanese Unexamined Patent Application Publication No. 2017-66358

SUMMARY OF INVENTION

Technical Problem

To solve the problems, it is an object of the present invention to provide a resin composition that provides a film having good transparency, texture, and flexibility.

Solution to Problem

The present invention provides a resin composition containing a urethane resin (A), an acrylic resin (B), and water (C), in which the acrylic resin (B) is a polymer of a polymerizable compound containing a (meth)acrylic compound (b-1) having a hydroxy group and has a glass transition temperature of 40° C. or higher.

The present invention also provides a synthetic leather having at least a base (i), an adhesive layer (ii), and a skin layer (iii), in which the skin layer (iii) is formed from the resin composition.

Advantageous Effects of Invention

The resin composition of the present invention provides a film having good transparency, texture, and flexibility.

The resin composition of the present invention can be suitably used as a material for the production of synthetic leathers, gloves, curtains, sheets, and so forth. In particular, the resin composition can be suitably used for the formation of skin layers of synthetic leathers.

DESCRIPTION OF EMBODIMENTS

A resin composition of the present invention contains a urethane resin (A), a specific acrylic resin (B), and water (C).

The urethane resin (A) can be dispersed in water (C). Examples of a urethane resin that can be used include urethane resins having hydrophilic groups, such as anionic groups, cationic groups, and nonionic groups; and urethane resins forcibly dispersed in water (C) with an emulsifier. These urethane resins (A) may be used alone or in combination of two or more.

An example of a method for producing a urethane resin having the anionic group is a method in which one or more compounds selected from carboxy group-containing compounds and sulfonyl group-containing compounds are used as raw materials.

Examples of the carboxy group-containing compounds that can be used include 2,2-dimethylolpropionic acid, 2,2-dimethylolbutanoic acid, 2,2-dimethylolbutyric acid, 2,2-dimethylolpropionic acid, or 2,2-valeric acid. These compounds may be used alone or in combination of two or more.

Examples of the sulfonyl group-containing compound that can be used 3,4-diaminobutanesulfonic acid, 3,6-diamino-2-toluenesulfonic acid, 2,6-diaminobenzenesulfonic acid, and N-(2-aminoethyl)-2-aminoethylsulfonic acid. These compounds may be used alone or in combination of two or more.

Some or all of the carboxy groups and the sulfonyl groups in the resin composition may be neutralized with a basic compound. Examples of the basic compound that can be used include organic amines, such as ammonia, triethylamine, pyridine, and morpholine; alkanolamines, such as monoethanolamine and dimethylethanolamine; basic metal compounds containing sodium, potassium, lithium, or calcium.

An example of a method for producing a urethane resin having the cationic group is a method in which one or two or more amino group-containing compounds are used as raw materials.

Examples of the amino group-containing compounds that can be used include primary and secondary amino group-containing compounds, such as triethylenetetramine and diethylenetriamine; and tertiary amino group-containing compounds, such as N-alkyldialkanolamines, e.g., N-methyldiethanolamine and N-ethyldiethanolamine, and N-alkyldiaminoalkylamines, e.g., N-methyldiaminoethylamine and N-ethyldiaminoethylamine. These compounds may be used alone or in combination of two or more.

An example of a method for producing a urethane resin having the nonionic group is a method in which one or two or more compounds each having an oxyethylene structure are used as raw materials.

Examples of the compounds having an oxyethylene structure that can be used include polyether polyols having an oxyethylene structure, such as polyoxyethylene glycol, polyoxyethylene-polyoxypropylene glycol, and polyoxyethylene-polyoxytetramethylene glycol. These compounds may be used alone or in combination of two or more.

Examples of the emulsifier that can be used for the production of a urethane resin forcibly dispersed in water (C) include nonionic emulsifiers, such as polyoxyethylene nonylphenyl ether, polyoxyethylene lauryl ether, polyoxyethylene styrylphenyl ether, polyoxyethylene sorbitol tetraoleate, and polyoxyethylene-polyoxypropylene copolymers; anionic emulsifiers, such as salts of fatty acids, e.g., sodium oleate, alkyl sulfates, alkylbenzene sulfonates, alkyl sulfosuccinates, naphthalene sulfonates, polyoxyethylene alkyl sulfates, sodium alkane sulfonates, and sodium alkyl diphenyl ether sulfonates; and cationic emulsifiers, such as alkylamine salts, alkyltrimethylammonium salts, and alkyldimethylbenzylammonium salts. These emulsifiers may be used alone or in combination of two or more.

As the urethane resin (A), specifically, for example, a reaction product of a raw material used for the production of the hydrophilic group-containing urethane resin, a polyisocyanate (a1), a polyol (a2), and, if necessary, a chain extender (a3) can be used.

Examples of the polyisocyanate (a1) that can be used include aromatic polyisocyanates, such as phenylene diisocyanate, tolylene diisocyanate, diphenylmethane diisocyanate, xylylene diisocyanate, naphthalene diisocyanate, polymethylene polyphenyl polyisocyanate, and carbodiimidized diphenylmethane polyisocyanate; and aliphatic and alicyclic polyisocyanates, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, and norbornene diisocyanate. These polyisocyanates may be used alone or in combination of two or more.

Examples of the polyol (a2) that can be used include polyether polyol, polyester polyol, polyacrylate polyol, polycarbonate polyol, and polybutadiene polyol. These polyols may be used alone or in combination of two or more.

The number-average molecular weight of the polyol (a2) is preferably in the range of 500 to 100,000, more preferably 800 to 50,000 in view of the mechanical strength of a film to be formed. The number-average molecular weight of the polyol (a2) is a value measured by gel permeation column chromatography (GPC).

Examples of the chain extender (a3) that can be used include chain extenders having a number-average molecular weight of 50 to 450. Specific examples thereof include amino group-containing chain extenders, such as ethylenediamine, 1,2-propanediamine, 1,6-hexamethylenediamine, piperazine, 2,5-dimethylpiperazine, isophorone diamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, 1,4-cyclohexanediamine, and hydrazine; and hydroxy group-containing chain extenders, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerol, sorbitol, bisphenol A, 4,4'-dihydroxydiphenyl, 4,4'-dihydroxydiphenyl ether, and trimethylolpropane. These chain extenders may be used alone or in combination of two or more.

In the case of using the chain extender (a3), the amount of the chain extender (a3) used is preferably in the range of 0.5% to 30% by mass based on the total mass of the polyisocyanate (a1), the polyol (a2), and the chain extender (a3) from the viewpoint of further improving the mechanical strength of the film.

Examples of a method for producing the urethane resin (A) include a production method in which the polyisocyanate (a1), the polyol (a2), and a raw material used for the production of the hydrophilic group-containing urethane resin are reacted to produce an isocyanate group-containing urethane prepolymer, and then, if necessary, the urethane prepolymer and the chain extender (a3) are reacted; and a method in which the polyisocyanate (a1), the polyol (a2), the raw material used for the production of the hydrophilic group-containing urethane resin, and, if necessary, the chain extender (a3) are fed in one operation and reacted. For example, these reactions are performed at 50° C. to 100° C. for 3 to 10 hours.

The mole ratio of the isocyanate groups of the polyisocyanate (a1) to the total of the hydroxy groups of the raw material used for the production of the hydrophilic group-containing urethane resin, the hydroxy groups of the polyol (a2), and the hydroxy groups and the amino groups of the chain extender (a3), [(isocyanate group)/(hydroxy group and amino group)], is preferably in the range of 0.8 to 1.2, more preferably 0.9 to 1.1.

When the urethane resin (A) is produced, the isocyanate groups remaining in the urethane resin (A) are preferably inactivated. When the isocyanate groups are inactivated, an alcohol having one hydroxy group, such as methanol, is preferably used. The amount of the alcohol used is preferably in the range of 0.001 to 10 parts by mass based on 100 parts by mass of the urethane resin (A).

When the urethane resin (A) is produced, an organic solvent may be used. Examples of the organic solvent that can be used include ketone compounds, such as acetone and methyl ethyl ketone; ether compounds, such as tetrahydrofuran and dioxane; acetate compounds, such as ethyl acetate and butyl acetate; nitrile compounds, such as acetonitrile; and amide compounds, such as dimethylformamide and N-methylpyrrolidone. These organic solvents may be used alone or in combination of two or more. Preferably, the organic solvent is finally removed, for example, by a distillation method.

The urethane linkage content of the urethane resin (A) is preferably in the range of 0.4 to 9 mol/kg, more preferably 0.6 to 7 mol/kg, even more preferably 0.8 to 5 mol/kg because the formation of hydrogen bonds with the hydroxy groups of the acrylic resin (B), which will be described below, improves the compatibility between the urethane resin (A) and the acrylic resin (B) to achieve better transparency, texture, and flexibility. The urethane linkage content of the urethane resin (A) is a value calculated from the amounts of the polyisocyanate (a1), the polyol (a2), the raw material used for the production of the hydrophilic group-containing urethane resin, and the chain extender (a3) fed.

For example, the acrylic resin (B) can be dispersed in water (C). The dispersion state of the acrylic resin (B) in water is not particularly limited. Examples thereof include an emulsion forcibly formed with an emulsifier and a dispersion containing a resin having nonionic groups and/or neutralized ionic groups. As the emulsifier and a neutralizing agent used for neutralization, the same emulsifier and neutralizing agent that can be used for the urethane resin (A) can be used.

It is essential that the acrylic resin (B) have a glass transition temperature of 40° C. or higher. When the glass transition temperature of the acrylic resin (B) is within the above range, a film to be obtained has an appropriate hardness and good texture (feel). The use of the acrylic resin (B) in combination with the urethane resin (A) can achieve both appropriate hardness and elasticity to provide good flexibility. The glass transition temperature of the acrylic resin (B) is preferably in the range of 40° C. to 110° C., more preferably 50° C. to 100° C. from the viewpoint of achieving better texture and flexibility. The glass transition temperature of the acrylic resin (B) is a value measured by differential scanning calorimetry (DSC) in accordance with JIS K 7121-1987. Specifically, the polymer (A) is placed in a differential scanning calorimeter, heated to a temperature of (Tmg+50° C.) at a rate of temperature increase of 10°

C./min, held for 3 minutes, and rapidly cooled. A midpoint glass transition temperature (Tmg) read from a differential thermal curve is defined as the glass transition temperature.

It is essential that the acrylic resin (B) be prepared from a hydroxy group-containing (meth)acrylic compound (b-1) as a raw material in order to provide good transparency. For example, the use of (b-1) as a raw material results in, as an additional advantage, a synthetic leather having good design without using a surface treatment layer on a skin layer when the resin composition of the present invention is used as the skin layer of the synthetic leather; thus, it is possible to simplify the production process of the synthetic leather.

Examples of the hydroxy group-containing (meth)acrylic compound (b-1) that can be used include hydroxy group-containing alkyl (meth)acrylates, such as 2-hydroxyethyl (meth)acrylate, 2-hydroxypropyl (meth)acrylate, 3-hydroxypropyl (meth)acrylate, 3-hydroxybutyl (meth)acrylate, 4-hydroxybutyl (meth)acrylate, 6-hydroxyhexyl (meth)acrylate, and hydroxyethylacrylamide; hydroxy group-containing polyfunctional (meth)acrylates, such as trimethylolpropane di(meth)acrylate, pentaerythritol tri(meth)acrylate, dipentaerythritol penta(meth)acrylate; and poly(ethylene glycol) monoacrylate and poly(propylene glycol) monoacrylate. These compounds may be used alone or in combination of two or more.

The amount of (b-1) used is preferably in the range of 4% to 27% by mass, more preferably 6% to 25% by mass, even more preferably 8% to 24% by mass based on the total amount of the polymerizable compound from the viewpoint of achieving better transparency, texture, and flexibility.

As the polymerizable compound, a polymerizable compound other than (b-1) may be contained.

As the polymerizable compound other than (b-1), it is preferable to use a polymerizable compound (b-2) in which the hydrogen bond term ($\delta H$) in Hansen solubility parameters is 2.2 MPa$^{0.5}$ or more, from the viewpoint of improving compatibility with the urethane resin (A) to provide better transparency. The hydrogen bond term ($\delta H$) in Hansen solubility parameters of the polymerizable compound (b-2) is more preferably in the range of 2.2 to 35 MPa$^{0.5}$, even more preferably 2.5 to 25 MPa$^{0.5}$, from the viewpoint of achieving better transparency.

The Hansen solubility parameters are ones such that the solubility parameter introduced by Hildebrand is divided into three components of a dispersion term ($\delta D$), a polar term ($\delta P$), and a hydrogen bonding term ($\delta H$) and these components are represented in a three-dimensional space. The dispersion term ($\delta D$) represents an effect due to a dispersion force, the polar term ($\delta P$) represents an effect due to a dipole-dipole force, and the hydrogen bonding term ($\delta H$) represents an effect due to hydrogen bonding strength.

The dispersion term ($\delta D$) in the Hansen solubility parameters for the polymerizable compound (b-2) is preferably in the range of 15.5 to 21.5 Pa$^{0.5}$, more preferably 16 to 21.0 Pa$^{0.5}$. The polar term ($\delta P$) in the Hansen solubility parameters is preferably in the range of 0.5 to 22 Pa$^{0.5}$, more preferably 0.9 to 20 Pa$^{0.5}$.

The definition and calculation of the Hansen solubility parameters are described in "Hansen Solubility Parameters; A Users Handbook" by Charles M. Hansen (CRC Press, 2007). Regarding a polymerizable compound for which no parameter values are described in literature, the Hansen solubility parameters can be estimated from its chemical structure using computer software "Hansen Solubility Parameter in Practice (HSPiP)". In the present invention, for a polymerizable compound for which parameter values are described in literature, those values are used. Regarding a polymerizable compound for which no parameter values are described in literature, parameter values estimated using HSPiP version 4.1.06 are used.

As the polymerizable compound, a type of compound may be used, or two or more types of compounds may be used in combination. When two or more types are used in combination, the weighted average values of the three Hansen solubility parameters for the polymerizable compounds can be used.

Specific examples of the polymerizable compound (b-2) include acrylonitrile ($\delta D=19.2$ MPa$^{0.5}$, $\delta P=18.5$ MPa$^{0.5}$, $\delta H=5.8$ MPa$^{0.5}$), ethylene glycol dimethacrylate ($\delta D=17.2$ MPa$^{0.5}$, $\delta P=1.3$ MPa$^{0.5}$, $\delta H=3.5$ MPa$^{0.5}$), phenyl methacrylate ($\delta D=18.4$ MPa$^{0.5}$, $\delta P=1.7$ MPa$^{0.5}$, $\delta H=3.6$ MPa$^{0.5}$), methyl methacrylate ($\delta D=16.6$ MPa$^{0.5}$, $\delta P=1.8$ MPa$^{0.5}$, $\delta H=4$ MPa$^{0.5}$), isopropyl methacrylate ($\delta D=16$ MPa$^{0.5}$, $\delta P=1.3$ MPa$^{0.5}$, $\delta H=2.4$ MPa$^{0.5}$), cyclohexyl methacrylate ($\delta D=17.2$ MPa$^{0.5}$, $\delta P=1$ MPa$^{0.5}$, $\delta H=2.6$ MPa$^{0.5}$), ethyl methacrylate ($\delta D=16.3$ MPa$^{0.5}$, $\delta P=1.8$ MPa$^{0.5}$, $\delta H=3.4$ MPa$^{0.5}$), sec-butyl methacrylate ($\delta D=16$ MPa$^{0.5}$, $\delta P=0.9$ MPa$^{0.5}$, $\delta H=2.1$ MPa$^{0.5}$), benzyl methacrylate ($\delta D=18.2$ MPa$^{0.5}$, $\delta P=1.7$ MPa$^{0.5}$, $\delta H=3.4$ MPa$^{0.5}$), isobutyl methacrylate ($\delta D=16$ MPa$^{0.5}$, $\delta P=1.2$ MPa$^{0.5}$, $\delta H=2.5$ MPa$^{0.5}$), glycidyl methacrylate ($\delta D=17.4$ MPa$^{0.5}$, $\delta P=4.5$ MPa$^{0.5}$, $\delta H=5.1$ MPa$^{0.5}$), stearyl methacrylate ($\delta D=16.2$ MPa$^{0.5}$, $\delta P=1.7$ MPa$^{0.5}$, $\delta H=2.7$ Pa$^{0.05}$), n-propyl methacrylate ($\delta D=16.3$ MPa$^{0.5}$, $\delta P=1.5$ MPa$^{0.5}$, $\delta H=3$ MPa$^{0.5}$), n-butyl methacrylate ($\delta D=16.4$ MPa$^{0.5}$, $\delta P=1.6$ MPa$^{0.5}$, $\delta H=3$ MPa$^{0.5}$), 2-methoxy-ethyl methacrylate ($\delta D=16.5$ MPa$^{0.5}$, $\delta P=3$ MPa$^{0.5}$, $\delta H=4.9$ MPa$^{0.5}$), 2-ethylhexyl methacrylate ($\delta D=16.1$ MPa$^{0.5}$, $\delta P=1.2$ MPa$^{0.5}$, $\delta H=2.3$ MPa$^{0.5}$), tridecyl methacrylate ($\delta D=16.2$ MPa$^{0.5}$, $\delta P=1.7$ MPa$^{0.5}$, $\delta H=2.8$ MPa$^{0.5}$), lauryl methacrylate ($\delta D=16.2$ MPa$^{0.5}$, $\delta P=1.7$ MPa$^{0.5}$, $\delta H=2.8$ MPa$^{0.5}$), tert-butyl acrylate ($\delta D=15.5$ MPa$^{0.5}$, $\delta P=2.3$ MPa$^{0.5}$, $\delta H=3.4$ MPa$^{0.5}$), stearyl acrylate ($\delta D=16.2$ MPa$^{0.5}$, $\delta P=2.2$ MPa$^{0.5}$, $\delta H=3.2$ MPa$^{0.5}$), cyclohexyl acrylate ($\delta D=17.5$ MPa$^{0.5}$, $\delta P=2.4$ MPa$^{0.5}$, $\delta H=3.9$ MPa$^{0.5}$), tetrahydrofurfuryl acrylate ($\delta D=17.6$ MPa$^{0.5}$, $\delta P=4.8$ MPa$^{0.5}$, $\delta H=5.4$ MPa$^{0.5}$), methyl acrylate ($\delta D=17$ MPa$^{0.5}$, $\delta P=4.7$ MPa$^{0.5}$, $\delta H=6.8$ MPa$^{0.5}$), benzyl acrylate ($\delta D=18.6$ MPa$^{0.5}$, $\delta P=3.2$ MPa$^{0.5}$, $\delta H=4.8$ MPa$^{0.5}$), lauryl acrylate ($\delta D=16.3$ MPa$^{0.5}$, $\delta P=2.4$ MPa$^{0.5}$, $\delta H=3.5$ MPa$^{0.5}$), isopropyl acrylate ($\delta D=16.2$ MPa$^{0.5}$, $\delta P=3.1$ MPa$^{0.5}$, $\delta H=4$ MPa$^{0.5}$), n-hexyl acrylate ($\delta D=16.3$ MPa$^{0.5}$, $\delta P=1.6$ MPa$^{0.5}$, $\delta H=2.9$ MPa$^{0.5}$), sec-butyl acrylate ($\delta D=16.2$ MPa$^{0.5}$, $\delta P=2.3$ MPa$^{0.5}$, $\delta H=3.5$ MPa$^{0.5}$), phenoxyethyl acrylate ($\delta D=18.5$ MPa$^{0.5}$, $\delta P=4.7$ MPa$^{0.5}$, $\delta H=5.9$ MPa$^{0.5}$), ethyl acrylate ($\delta D=16.6$ MPa$^{0.5}$, $\delta P=4.1$ MPa$^{0.5}$, $\delta H=5.5$ MPa$^{0.5}$), methoxy-polyethylene flycol acrylate (the amount by mole of oxyethylene groups added: 9) ($\delta D=16.4$ MPa$^{0.5}$, $\delta P=5.5$ MPa$^{0.5}$, $\delta H=7.1$ MPa$^{0.5}$), 2-methoxybutyl acrylate ($\delta D=16.4$ MPa$^{0.5}$, $\delta P=4.1$ MPa$^{0.5}$, $\delta H=4.9$ MPa$^{0.5}$), phenoxybenzyl acrylate ($\delta D=19.5$ MPa$^{0.5}$, $\delta P=4$ MPa$^{0.5}$, $\delta H=4.7$ MPa$^{0.5}$), isobutyl acrylate ($\delta D=16.1$ MPa$^{0.5}$, $\delta P=2.8$ MPa$^{0.5}$, $\delta H=3.9$ MPa$^{0.5}$), 3-ethoxypropyl acrylate ($\delta D=16.4$ MPa$^{0.5}$, $\delta P=5$ MPa$^{0.5}$, $\delta H=5.2$ MPa$^{0.5}$), 3-methoxybutyl acrylate ($\delta D=16.5$ MPa$^{0.5}$, $\delta P=4.2$ MPa$^{0.5}$, $\delta H=5.1$ MPa$^{0.5}$), n-propyl acrylate ($\delta D=16.5$ MPa$^{0.5}$, $\delta P=3.4$ MPa$^{0.5}$, $\delta H=4.7$ MPa$^{0.5}$), methoxy triethylene glycol acrylate ($\delta D=16.6$ MPa$^{0.5}$, $\delta P=5.3$ MPa$^{0.5}$, $\delta H=7$ MPa$^{0.5}$), 2-ethoxyethyl acrylate ($\delta D=16.5$ MPa$^{0.5}$, $\delta P=4.6$ MPa$^{0.5}$, $\delta H=6$ MPa$^{0.5}$), 2-ethoxybutyl acrylate ($\delta D=16.2$ MPa$^{0.5}$, $\delta P=3.9$ MPa$^{0.5}$, $\delta H=4.4$ MPa$^{0.5}$), tridecyl acrylate ($\delta D=16.3$ MPa$^{0.5}$, $\delta P=2.4$ MPa$^{0.5}$, $\delta H=3.4$ MPa$^{0.5}$), butyl acrylate ($\delta D=16.6$ MPa$^{0.5}$, $\delta P=3.2$ MPa$^{0.5}$, $\delta H=4.5$ MPa$^{0.5}$), n-hexyl acrylate ($\delta D=16.4$ MPa$^{0.5}$, $\delta P=2.9$ MPa$^{0.5}$, $\delta H=4.1$ MPa$^{0.5}$), 2-methoxyethyl acrylate ($\delta D=16.7$ MPa$^{0.5}$, $\delta P=5$ MPa$^{0.5}$, $\delta H=6.9$ MPa$^{0.5}$), nonyl acrylate ($\delta D$=16.4 MPa$^{0.5}$, $\delta P$=2.6 MPa$^{0.5}$, $\delta H$=3.7 MPa$^{0.5}$), heptyl acrylate ($\delta D$=16.4 MPa$^{0.5}$, $\delta P$=3 MPa$^{0.5}$, $\delta H$=3.8 MPa$^{0.5}$), 2-ethylhexyl acrylate ($\delta D$=16.2 MPa$^{0.5}$, $\delta P$=2.2 MPa$^{0.5}$, $\delta H$=3.2 MPa$^{0.5}$), ethoxy diethylene glycol acrylate ($\delta D$=16.4 MPa$^{0.5}$, $\delta P$=4.8 MPa$^{0.5}$, $\delta H$=6.3 MPa$^{0.5}$), n-octyl acrylate ($\delta D$=16.4 MPa$^{0.5}$, $\delta P$=2.7 MPa$^{0.5}$, $\delta H$=3.8 MPa$^{0.5}$), methacrylic acid ($\delta D$=17 MPa$^{0.5}$, $\delta P$=3.4 MPa$^{0.5}$, $\delta H$=12.6 MPa$^{0.5}$), itaconic acid ($\delta D$=18.1 MPa$^{0.5}$, $\delta P$=7.9 MPa$^{0.5}$, $\delta H$=21.7 MPa$^{0.5}$), acrylic acid ($\delta D$=19.6 MPa$^{0.5}$, $\delta P$=8.9 MPa$^{0.5}$, $\delta H$=22 MPa$^{0.5}$), maleic acid ($\delta D$=20 MPa$^{0.5}$, $\delta P$=18.2 MPa$^{0.5}$, $\delta H$=9.6 MPa$^{0.5}$), N-methylolacrylamide ($\delta D$=20.5 MPa$^{0.5}$, $\delta P$=22 MPa$^{0.5}$, $\delta H$=25.2 MPa$^{0.5}$), acrylamide ($\delta D$=18.9 MPa$^{0.5}$, $\delta P$=18.9 MPa$^{0.5}$, $\delta H$=16.4 MPa$^{0.5}$), diacetone acrylamide ($\delta D$=17.6 MPa$^{0.5}$, $\delta P$=10.7 MPa$^{0.5}$, $\delta H$=6.3 MPa$^{0.5}$), 2-acryloyloxyethyl acid phosphate ($\delta D$=21.3 MPa$^{0.5}$, $\delta P$=14.4 MPa$^{0.5}$, $\delta H$=30.8 MPa$^{0.5}$), and vinyl acetate ($\delta D$=17 MPa$^{0.5}$, $\delta P$=4.7 MPa$^{0.5}$, $\delta H$=6.8 MPa$^{0.5}$). These polymerizable compounds (b-2) may be used alone or in combination of two or more. Among these, one or more compounds selected from the group consisting of methyl methacrylate, n-butyl methacrylate, ethyl methacrylate, and cyclohexyl methacrylate are preferably used from the viewpoint of achieving better transparency.

Examples of another usable polymerizable compound different from (b-1) and (b-2) described above include α-methylstyrene ($\delta D$=18.2 MPa$^{0.5}$, $\delta P$=0 MPa$^{0.5}$, $\delta H$=0.4 MPa$^{0.5}$), tert-butylstyrene ($\delta D$=17.2 MPa$^{0.5}$, $\delta P$=0.8 MPa$^{0.5}$, $\delta H$=1.1 MPa$^{0.5}$), styrene ($\delta D$=18.8 MPa$^{0.5}$, $\delta P$=0.7 MPa$^{0.5}$, $\delta H$=1.8 MPa$^{0.5}$), m-methylstyrene ($\delta D$=18.7 MPa$^{0.5}$, $\delta P$=0.9 MPa$^{0.5}$, $\delta H$=1.1 MPa$^{0.5}$), p-methylstyrene ($\delta D$=18.9 MPa$^{0.5}$, $\delta P$=1.6 MPa$^{0.5}$, $\delta H$=2.1 MPa$^{0.5}$), methacrylonitrile ($\delta D$=16.7 MPa$^{0.5}$, $\delta P$=9.1 MPa$^{0.5}$, $\delta H$=1.7 MPa$^{0.5}$), isobornyl methacrylate ($\delta D$=17.1 MPa$^{0.5}$, $\delta P$=1.8 MPa$^{0.5}$, $\delta H$=2.1 MPa$^{0.5}$), tert-butyl methacrylate ($\delta D$=15.5 MPa$^{0.5}$, $\delta P$=0.9 MPa$^{0.5}$, $\delta H$=2.1 MPa$^{0.5}$), and sec-butyl methacrylate ($\delta D$=16 MPa$^{0.5}$, $\delta P$=0.9 MPa$^{0.5}$, $\delta H$=2.1 MPa$^{0.5}$). These polymerizable compounds (b-2) may be used or in combination of two or more. The amount of the another polymerizable compound used is preferably 5% or less by mass, more preferably 1% or less by mass in the polymerizable compound.

As a method for producing the acrylic resin (B), a known radical polymerization can be employed. An example thereof is a method in which a polymerization initiator is added to the polymerizable compound and then radical polymerization is performed in water in the temperature range of 40° C. to 90° C. for 1 to 20 hours.

Examples of the polymerization initiator that can be used include peroxides, such as hydrogen peroxide, potassium persulfate, sodium persulfate, and ammonium persulfate; organic peroxides, such as benzoyl peroxide, tert-butyl peroxy-2-ethylhexanoate, and cumene hydroperoxide; and azo compounds, such as 2,2'-azobis-(2-aminodipropane) dihydrochloride, 2,2'-azobis-(N,N'-dimethyleneisobutylamidine) dihydrochloride, azobisisobutyronitrile, 2,2'-azobis(2-methylbutyronitrile), and 2,2'-azobis(2,4-dimethylvaleronitrile). These polymerization initiators may be used alone or in combination of two or more. The amount of the polymerization initiator used is in the range of, for example, 0.001 to 5 parts by mass based on 100 parts by mass of the polymerizable compound.

The hydroxy group content of the acrylic resin (B) is preferably in the range of 300 to 2,000 mmol/kg, more preferably 600 to 1,800 mmol/kg, from the viewpoint of achieving better transparency, texture, and flexibility.

The aromatic ring content of the acrylic resin (B) is preferably 10 mol/kg or less, more preferably 1 mol/kg or less from the viewpoint of improving compatibility with the urethane resin (A) to achieve better transparency, texture, and flexibility.

The acid value of the acrylic resin (B) is preferably in the range of 0 to 25 mgKOH/g from the viewpoint of achieving better texture. The acid value of the acrylic resin (B) is the mass (mg) of potassium hydroxide required to neutralize acid groups contained in 1 g of the acrylic resin before neutralization and is a value measured in accordance with JIS K 0070:1996.

The amount of the acrylic resin (B) contained is preferably in the range of 1 to 100 parts by mass, more preferably 3 to 65 parts by mass based on 100 parts by mass of the urethane resin (A) from the viewpoint of better transparency, texture, and flexibility.

Examples of the water (C) that can be used include ion-exchanged water, distilled water, and tap water. Among these, ion-exchanged water with few impurities is preferably used.

The amount of the water (C) contained is preferably in the range of 10% to 90% by mass, more preferably 30% to 80% by mass in the resin composition, from the viewpoint of handleability and coatability of the resin composition.

The resin composition of the present invention may contain other additives, as needed, in addition to the urethane resin (A), the acrylic resin (B), and the water (C).

Examples of the other additives that can be used include thickeners, urethanization catalysts, fillers, foaming agents, pigments, dyes, oil repellent agents, hollow foams, flame retardants, antifoaming agents, levelling agents, and anti-blocking agents. These additives may be used alone or in combination of two or more.

A synthetic leather of the present invention will be described below.

The synthetic leather includes at least a base (i), an adhesive layer (ii), and a skin layer (iii). The skin layer (iii) is formed from the resin composition of the present invention.

Examples of the base (i) that can be used include plastic bases; and fiber bases, such as nonwoven fabrics, woven fabrics, and knittings. Among these, a fiber base is preferably used from the viewpoint of achieving good flexibility. The fiber base can be composed of, for example, polyester fibers, nylon fibers, acrylic fibers, acetate fibers, rayon fibers, poly(lactic acid) fibers, cotton, hemp, silk, sheep wool, or blended fibers thereof.

The adhesive layer (ii) is composed of a known adhesive and has a thickness of, for example, 5 to 100 μm.

Examples of the known adhesive that can be used include solvent-free urethane resin compositions, such as moisture-curable hot melt resins, water-based urethane resin compositions containing urethane resins dispersed in water, water-based acrylic resin compositions containing acrylic resins dispersed in water, solvent-based urethane resin compositions, and solvent-based acrylic resin compositions. These adhesives may be used alone or in combination of two or more.

The skin layer (iii) is composed of the resin composition of the present invention and has a thickness of, for example, 5 to 100 μm.

An example of a method for producing the synthetic leather is a method as follows: The resin composition of the present invention is applied to a release paper and dried to form the skin layer (iii). Then the adhesive is applied to the skin layer and dried to form the adhesive layer (ii). The adhesive layer (ii) and the base (i) are bonded together.

As a method for applying the resin composition of the present invention and the adhesive, for example, a method using, for example, a roll coater, a knife coater, a comma coater, or an applicator is employed.

Regarding the drying conditions for the formation of the skin layer (iii) and the adhesive layer (ii), for example, a method of drying them at 40° C. to 120° C. for 10 minutes to 3 days is employed.

As described above, the resin composition of the present invention provides a film having good transparency, texture, and flexibility. Thus, the resin composition of the present invention can be suitably used as a material for the production of synthetic leathers, gloves, curtains, sheets, and so forth. In particular, the resin composition can be suitably used for the formation of skin layers of synthetic leathers.

EXAMPLES

The present invention will be described in more detail by examples.

[Synthesis Example 1] Preparation of Acrylic Resin (1)

First, 60 parts by mass of methyl methacrylate (hereinafter, abbreviated as "MMA"), 30 parts by mass of n-butyl methacrylate (hereinafter, abbreviated as "BMA"), 10 parts by mass of 2-hydroxyethyl methacrylate (hereinafter, abbreviated as "HEMA"), 200 parts by mass of water, and 5 parts by mass of a nonionic emulsifier ("Noygen EA-207D", available from Dai ichi Kogyo Seiyaku Co., Ltd., polyoxyethylene distyrenated phenyl ether) were mixed and then emulsified with a homogenizer ("TK Homodisper", available from Tokushu Kika Kogyo Co., Ltd.) to prepare a monomer emulsion.

Next, 300 parts by mass of water was fed into a flask equipped with a stirrer, a nitrogen inlet, and a reflux condenser and heated to 50° C. while stirred in a nitrogen gas atmosphere. Then 2 parts by mass of ammonium persulfate (hereinafter, abbreviated as "APS") and 2 parts by mass of sodium metabisulfite (hereinafter, abbreviated as "SMS") were added to the flask and dissolved. The monomer emulsion prepared above, 20 parts by mass of a 5% by mass APS aqueous solution, and 20 parts by mass of a 5% by mass SMS aqueous solution were added dropwise to the flask over a period of 3 hours. The temperature in the flask during the dropwise addition was controlled to 50° C. to 60° C. After completion of the dropwise addition, the reaction was performed at 60° C. for another 1 hour. The mixture was cooled to room temperature and then neutralized by the addition of 3.5 parts by mass of a 25% by mass aqueous ammonia solution. Water was added in such a manner that the resin content was 45% by mass. The mixture was uniformly mixed to prepare an aqueous dispersion of an acrylic resin (1). The acrylic resin (1) had a glass transition temperature of 70° C., a hydroxy group content of 766 mmol/kg, an aromatic ring content of 0 mmol/kg, and an acid value of 0 mgKOH/g.

[Synthesis Example 2] Preparation of Acrylic Resin (2)

An aqueous dispersion of an acrylic resin (2) was prepared as in Synthesis example 1, except that the amount of MMA used was changed to 40 parts by mass and the amount of BMA used was changed to 50 parts by mass. The acrylic resin (2) had a glass transition temperature 52° C., a hydroxy group content of 766 mmol/kg, an aromatic ring content of 0 mmol/kg, and an acid value of 0 mgKOH/g.

[Synthesis Example 3] Preparation of Acrylic Resin (3)

An aqueous dispersion of an acrylic resin (3) was prepared as in Synthesis example 1, except that 60 parts by mass of MMA was changed to 60 parts by mass of ethyl methacrylate (hereinafter, abbreviated as "EMA") and 30 parts by mass of BMA was changed to 30 parts by mass of cyclohexyl methacrylate (hereinafter, abbreviated as "CHMA"). The acrylic resin (3) had a glass transition temperature of 60° C., a hydroxy group content of 766 mmol/kg, an aromatic ring content of 0 mmol/kg, and an acid value of 0 mgKOH/g.

[Synthesis Example 4] Preparation of Acrylic Resin (R1)

An aqueous dispersion of an acrylic resin (R1) was prepared as in Synthesis example 1, except that the amount of MMA used was changed to 5 parts by mass and the amount of BMA used was changed to 85 parts by mass. The acrylic resin (R1) had a glass transition temperature of 27° C., a hydroxy group content of 766 mmol/kg, an aromatic ring content of 0 mmol/kg, and an acid value of 0 mgKOH/g.

[Synthesis Example 5] Preparation of Acrylic Resin (R2)

An aqueous dispersion of an acrylic resin (R2) was prepared as in Synthesis example 1, except that the amount of MMA used was changed to 97 parts by mass, the amounts of BMA and HEMA used were changed to 0 parts by mass, and 3 parts by mass of acrylic acid (hereinafter, abbreviated as "AA") was added. The acrylic resin (R2) had a glass transition temperature of 102° C., a hydroxy group content of 0 mmol/kg, an aromatic ring content of 0 mmol/kg, and an acid value of 21 mgKOH/g.

[Synthesis Example 6] Preparation of Acrylic Resin (R3)

An aqueous dispersion of an acrylic resin (R3) was prepared as in Synthesis example 1, except that the amount of MMA used was changed to 5 parts by mass, the amount of BMA used was changed to 5 parts by mass, the amount of HEMA used was changed to 0 parts by mass, and 90 parts by mass of St was added. The acrylic resin (R3) had a glass transition temperature of 98° C., a hydroxy group content of 0 mmol/kg, an aromatic ring content of 8,641 mmol/kg, and an acid value of 0 mgKOH/g.

[Preparation Example 1] Preparation of Adhesive Layer Formation Resin Composition First, 100 parts by mass of an aqueous dispersion of a polyether-based urethane resin ("Hydran WLA-407", available from DIC Corporation) and 10 parts by mass of an isocyanate cross-linking agent ("Hydran Assister C5", available from DIC Corporation) were placed. The mixture was stirred with a mechanical mixer at 2,000 rpm for 2 minutes and defoamed with a vacuum defoaming device to prepare an adhesive layer formation resin composition.

[Synthesis Example 7] Preparation of Urethane Resin (A-1) Composition

In the presence of 1,296 parts by mass of methyl ethyl ketone and 0.1 parts by mass of tin(II) octanoate, 1,000 parts by mass of polycarbonate diol ("Eternacoll UH-200", available from Ube Industries, Ltd.), 34 parts by mass of dimethylolpropionic acid, and 262 parts by mass of dicyclohexylmethane diisocyanate were reacted at 70° C. in such a manner that the percentage of NCO reached 0.8%, thereby preparing a terminal isocyanate group-containing urethane prepolymer (A'1) solution in methyl ethyl ketone.

Then 2,592 parts by mass of the terminal isocyanate group-containing urethane prepolymer (A'-1) solution in methyl ethyl ketone was mixed with 28 parts by mass of triethylamine and then mixed with 2,592 parts by mass of water to perform phase inversion emulsification, thereby preparing an emulsion.

Next, 404 parts by mass of an aqueous chain extender solution containing 40 parts by mass of isophorone diamine was added and mixed with the resulting emulsion to allow a chain elongation reaction to occur.

Removal of methyl ethyl ketone from the reaction mixture resulted in a urethane resin (A-1) composition having a non-volatile content of 30% by mass. The urethane resin (A-1) had a urethane linkage content of 1.5 mol/kg.

[Synthesis Example 8] Preparation of Urethane Resin (A-2) Composition

In the presence of 1,296 parts by mass of methyl ethyl ketone and 0.1 parts by mass of tin(II) octanoate, 1,000 parts by mass of poly(tetramethylene glycol) (number-average molecular weight: 2,000), 34 parts by mass of dimethylolpropionic acid, and 262 parts by mass of dicyclohexylmethane diisocyanate were reacted at 70° C. in such a manner that the percentage of NCO reached 0.8%, thereby preparing a terminal isocyanate group-containing urethane prepolymer (A'-2) in methyl ethyl ketone.

Then 2,592 parts by mass of the terminal isocyanate group-containing urethane prepolymer (A'-2) solution in methyl ethyl ketone was mixed with 28 parts by mass of triethylamine and then mixed with 2,592 parts by mass of water to perform phase inversion emulsification, thereby preparing an emulsion.

Next, 404 parts by mass of an aqueous chain extender solution containing 40 parts by mass of isophorone diamine was added and mixed with the resulting emulsion to allow a chain elongation reaction to occur.

Removal of methyl ethyl ketone from the reaction mixture resulted in a urethane resin (A-2) composition having a non-volatile content of 30% by mass. The urethane resin (A-2) had a urethane linkage content of 1.5 mol/kg.

Example 1

First, 90 parts by mass of the urethane resin (A-1) composition prepared in Synthesis example 7, 10 parts by mass of the aqueous dispersion of the acrylic resin (1) prepared in Synthesis example 1, 2 parts by mass of a thickener ("Borch Gel ALA", available from Borchers Inc.), and 5 parts by mass of a black pigment ("Dilac HS-9550", available from DIC Corporation) were placed. The mixture was stirred with a mechanical mixer at 2,000 rpm for 2 minutes and defoamed with a vacuum defoaming device to prepare a skin layer formation resin composition.

The resulting skin layer resin composition was applied to a release paper ("EK-100D", available from Lintec Corporation) with a knife coater (coating thickness: 150 μm), and dried with a hot-air dryer at 70° C. for 2 minutes and then at 120° C. for 2 minutes to form a skin layer. Furthermore, the adhesive layer formation resin composition prepared in Preparation example 1 was applied to the skin layer with a knife coater (coating thickness: 150 μm), and dried with a hot-air dryer at 70° C. for 6 minutes. Finally, a non-woven fabric base was stacked and thermocompression bonded to the resulting dry article with a hot roll press (roll temperature: 100° C., nip pressure: 3 MPa/m$^2$, feed rate: 1 m/min). The resulting article was aged at 70° C. for 2 days with a hot-air dryer to provide a synthetic leather.

Examples 2 to 6 and Comparative Examples 1 to 3

Synthetic leathers were produced as in Example 1, except that the types and amounts of the urethane resin (A) and the acrylic resin (B) used were changed as given in Tables 1 and 2.

[Method for Measuring Number-Average Molecular Weight]

The number-average molecular weights of the polyols and so forth used in Examples and Comparative examples are values measured by gel permeation column chromatography (GPC) under conditions described below.

Measurement device: High-speed GPC device ("HLC-8220GPC", available from Tosoh Corporation)

Column: The following columns available from Tosoh Corporation were connected in series and used.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: Refractive index detector (RI)
Column temperature: 40° C.
Eluent: Tetrahydrofuran (THF)
Flow rate: 1.0 mL/min
Amount injected: 100 μL (a tetrahydrofuran solution with a sample concentration of 0.4% by mass)
Standard sample: A calibration curve was obtained with standard polystyrenes described below.

(Standard Polystyrene)
"TSKgel standard polystyrene A-500" available from Tosoh Corporation
"TSKgel standard polystyrene A-1000" available from Tosoh Corporation
"TSKgel standard polystyrene A-2500" available from Tosoh Corporation
"TSKgel standard polystyrene A-5000" available from Tosoh Corporation
"TSKgel standard polystyrene F-1" available from Tosoh Corporation
"TSKgel standard polystyrene F-2" available from Tosoh Corporation
"TSKgel standard polystyrene F-4" available from Tosoh Corporation
"TSKgel standard polystyrene F-10" available from Tosoh Corporation
"TSKgel standard polystyrene F-20" available from Tosoh Corporation
"TSKgel standard polystyrene F-40" available from Tosoh Corporation
"TSKgel standard polystyrene F-80" available from Tosoh Corporation "TSKgel standard polystyrene F-128" available from Tosoh Corporation "TSKgel standard polystyrene F-288" available from Tosoh Corporation "TSKgel standard polystyrene F-550" available from Tosoh Corporation

[Method for Evaluation of Transparency]

For each of the skin layer formation resin compositions prepared in the examples and the comparative examples, the resin composition before the thickener and the black pigment were mixed was applied to a transparent polyethylene terephthalate base with a knife coater to a thickness of 150 µm after the application, and dried with a hot-air dryer at 70° C. for 2 minutes and then at 120° C. for 2 minutes. The resulting film was visually observed and evaluated as described below.

"5": The film is transparent.
"3": The film is slightly cloudy.
"1": The film is cloudy.

[Method for Evaluation of Texture]

The skin layers of the synthetic leathers produced in the examples and the comparative examples were touched with a finger and evaluated as described below.

"5": The skin layer is not tacky.
"3": The skin layer is slightly tacky.
"1": The skin layer is tacky.

[Method for Evaluation of Flexibility]

The synthetic leather produced in each of the examples and the comparative examples was subjected to a folding test in which the synthetic leather was folded 20,000 times at 25° C. with "MIT folding tester" available from Toyo Seiki Seisaku-sho, Ltd. The surface state of the skin layer was visually observed and evaluated as described below.

"5": No cracks are observed.
"3": Some cracks are observed.
"1": Many cracks are observed.

TABLE 1

|  | Example 1 | Example 2 | Example 3 | Example 4 | Example 5 |
|---|---|---|---|---|---|
| Urethane resin (A) | (A-1) | (A-1) | (A-1) | (A-2) | (A-2) |
| Urethane linkage content (mol/kg) | 1.5 | 1.5 | 1.5 | 1.5 | 1.5 |
| Acrylic resin (B) | (1) | (2) | (3) | (1) | (2) |
| Raw material | HEMA MMA BMA | HEMA MMA BMA | HEMA EMA CHMA | HEMA MMA BMA | HEMA MMA BMA |
| Glass transition temperature (° C.) | 70 | 50 | 60 | 70 | 50 |
| Hydroxy group content (mmol/kg) | 766 | 766 | 766 | 766 | 766 |
| Amount of (B) based on 100 by mass of (A) (parts by mass, in terms of solid content) | 16.7 | 16.7 | 16.7 | 16.7 | 16.7 |
| Evaluation of transparency | 5 | 5 | 5 | 5 | 5 |
| Evaluation of texture | 5 | 5 | 5 | 5 | 5 |

TABLE 2

|  | Example 6 | Comparative example 1 | Comparative example 2 | Comparative example 3 |
|---|---|---|---|---|
| Urethane resin (A) | (A-2) | (A-1) | (A-1) | (A-2) |
| Urethane linkage content (mol/kg) | 1.5 | 1.5 | 1.5 | 1.5 |
| Acrylic resin (B) | (3) | (R1) | (R2) | (R3) |
| Raw material | HEMA EMA CHMA | HEMA MMA BMA | MMA AA | MMA BMA St |
| Glass transition temperature (° C.) | 60 | 27 | 102 | 98 |
| Hydroxy group content (mmol/kg) | 766 | 766 | 0 | 0 |
| Amount of (B) based on 100 by mass of (A) (parts by mass, in terms of solid content) | 16.7 | 16.7 | 16.7 | 16.7 |
| Evaluation of transparency | 5 | 5 | 3 | 1 |
| Evaluation of texture | 5 | 1 | 5 | 5 |

It was found that the resin composition of the present invention provides a film having good transparency, texture, and flexibility.

In Comparative example 1 in which the acrylic resin having a glass transition temperature lower than the range specified in the present invention was used in place of the acrylic resin (B), the texture was poor.

In Comparative example 2 in which the acrylic resin having no hydroxy group was used in place of the acrylic resin (B), the skin layer of the synthetic leather had a dull color and thus a poor appearance.

In Comparative example 3 in which the acrylic resin having no hydroxy group and containing styrene (monomer, δH<2.2) was used in place of the acrylic resin (B), the skin layer of the synthetic leather was cloudy, and thus the appearance was even worse.

The invention claimed is:

1. A synthetic leather, comprising at least a base (i), an adhesive layer (ii), and a skin layer (iii), wherein the skin layer (iii) is formed from a resin composition comprising a urethane resin (A), an acrylic resin (B), and water (C),
wherein the acrylic resin (B) is a polymer of a polymerizable compound containing a (meth)acrylic compound (b-1) having a hydroxy group and has a glass transition temperature of 40° C. or higher.

2. The synthetic leather according to claim 1, wherein the polymerizable compound as a raw material of the acrylic resin (B) contains, in addition to (b-1), a polymerizable compound (b-2) in which a hydrogen bond term (δH) in Hansen solubility parameters is 2.2 MPa$^{0.5}$ or more.

3. The synthetic leather according to claim 1, wherein the acrylic resin (B) has a hydroxy group content of 300 to 2,000 mmol/kg.

4. The synthetic leather according to claim 1, wherein an amount of the acrylic resin (B) contained is in the range of 1 to 100 parts by mass based on 100 parts by mass of the urethane resin (A).

5. The synthetic leather according to claim 1,
wherein the polymerizable compound as a raw material of the acrylic resin (B) contains, in addition to (b-1), a polymerizable compound (b-2) in which a hydrogen bond term (δH) in Hansen solubility parameters is 2.2 MPa$^{0.5}$ or more, and
wherein the acrylic resin (B) has a hydroxy group content of 300 to 2,000 mmol/kg.

6. The synthetic leather according to claim 1,
wherein the polymerizable compound as a raw material of the acrylic resin (B) contains, in addition to (b-1), a polymerizable compound (b-2) in which a hydrogen bond term ($\delta H$) in Hansen solubility parameters is 2.2 $MPa^{0.5}$ or more, and
wherein an amount of the acrylic resin (B) contained is in the range of 1 to 100 parts by mass based on 100 parts by mass of the urethane resin (A).

7. The synthetic leather according to claim 1, wherein the acrylic resin (B) has a hydroxy group content of 300 to 2,000 mmol/kg, and
wherein an amount of the acrylic resin (B) contained is in the range of 1 to 100 parts by mass based on 100 parts by mass of the urethane resin (A).

8. The synthetic leather according to claim 1,
wherein the polymerizable compound as a raw material of the acrylic resin (B) contains, in addition to (b-1), a polymerizable compound (b-2) in which a hydrogen bond term ($\delta H$) in Hansen solubility parameters is 2.2 $MPa^{0.5}$ or more,
wherein the acrylic resin (B) has a hydroxy group content of 300 to 2,000 mmol/kg, and
wherein an amount of the acrylic resin (B) contained is in the range of 1 to 100 parts by mass based on 100 parts by mass of the urethane resin (A).

\* \* \* \* \*